United States Patent [19]

Nonn et al.

[11] 4,082,505

[45] Apr. 4, 1978

[54] DYEING PREPARATIONS, WHICH ARE SOLUBLE IN COLD WATER, OF ANIONIC DYESTUFFS

[75] Inventors: Konrad Nonn; Karlheinz Wolf, both of Leverkusen; Reinold Hörnle, Cologne, all of Germany

[73] Assignee: Bayer Aktiengesellschaft, Leverkusen, Germany

[21] Appl. No.: 621,555

[22] Filed: Oct. 10, 1975

[30] Foreign Application Priority Data

Oct. 18, 1974 Germany .............................. 2449580

[51] Int. Cl.² ...................... C09B 67/08; D06D 1/645
[52] U.S. Cl. ............................................ 8/85 R; 8/6; 8/172 R; 8/178 R; 8/177 AB
[58] Field of Search ..................... 8/85 R, 6, 172, 178, 8/177 AB

[56] References Cited

U.S. PATENT DOCUMENTS

| 2,448,448 | 8/1948 | MacGregor | 8/178 R |
|---|---|---|---|
| 2,900,218 | 8/1959 | Gray | 8/85 |
| 3,277,162 | 10/1966 | Johnson | 8/172 |
| 3,484,180 | 12/1969 | Humphreys et al. | 8/91 |

FOREIGN PATENT DOCUMENTS

| 421,862 | 1/1935 | United Kingdom | 8/85 |

OTHER PUBLICATIONS

Smith, The Chem. of Open–Chain Organic Nitrogen Cpds., pp. 277–282, W. A. Benjamin, N.Y. 1965.
Color Index, 2nd Ed. (1956) The American Ass'n of Textile Chem. & Colorists, pp. 2815–2816.

*Primary Examiner*—William E. Schulz
*Attorney, Agent, or Firm*—Plumley and Tyner

[57] ABSTRACT

Solid dyestuff preparations at most 10 microns, which contain an anionic dyestuff as the guanidinium salt, of a particle size, a surface-active agent and optionally further customary additives are soluble in cold water.

4 Claims, No Drawings

DYEING PREPARATIONS, WHICH ARE SOLUBLE IN COLD WATER, OF ANIONIC DYESTUFFS

The invention relates to solid dyeing preparations, which are soluble in cold water, of anionic dyestuffs, processes for their production, and their use.

In the text which follows, solubility is to be understood, not as the genuine physical solubility, but as a filter value usually employed in the dyeing field (the solubility being determined in accordance with H. Capponi and R. Pfister: "Die Bestimmung der Loslichkeit von Farbstoffen" ("The Determination of the solubility of Dyestuffs") in Textilveredelung 2 (1967), No. 1, page 13 – 16), and cold water solubility is correspondingly to be understood as the solubility at room temperatures.

It is known from German Offenlegungsschrift (German Published Specification) 2,127,669 that it is possible to produce, from dyestuffs which are sparingly soluble in cold water, may or may not contain metal, and are in the form of sodium salts, dyestuff preparations which are soluble in cold water by subjecting the dyestuffs, in aqueous suspension in the presence of a dispersing agent, to a mechanical comminution until the particle size of the dyestuff is at most 20 microns, and thereafter gently drying this suspension. In favourable cases, the grinding time is at least one hour, but frequently 20 to 50 hours.

It is a further disadvantage that dyestuffs of medium to good solubility (>20 g/l) cannot be converted by this process into dyestuff preparations which are soluble in cold water, since the genuinely dissolved portion forms, in the course of drying, coarsely crystalline particles which are no longer soluble in cold water.

It has now been found, surprisingly, that solid dyeing preparations, which are soluble in cold water, of anionic dyestuffs of which the absorption maximum lies in the visible or ultraviolet region of the spectrum, are obtained by subjecting the guanidinium salts of these anionic dyestuffs to a comminution in water, in the presence of surface-active agents, for 10 – 30 minutes, whereby the particle size of the dyestuffs which is obtained is at most 10 microns, and this dispersion is subsequently dried, if appropriate with addition of further auxiliaries.

Examples of suitable anionic dyestuffs are dyestuffs and metal complex dyestuffs, such as 1:1- and 1:2-metal complexes, which carry sulphonic acid groups and carboxylic acid groups and which can belong to a great diversity of chemical categories, for example to the phthalocyanine, nitro, diphenylmethane or triphenylmethane, oxazine, thiazine, dioxazine and xanthene series, but above all to the anthraquinone and azo series, especially to the monoazo, disazo or polyazo series.

Dyestuffs of the azo and anthraquinone series which are free from metal and carry sulphonic acid groups are preferred.

Metal complex azo dyestuffs which can be used are the 1:1-nickel, 1:1-cobalt, 1:1-copper or 1:1-chromium complexes, but above all the symmetrical or asymmetrical 1:2-cobalt or 1:2-chromium complexes of o-carboxy-o'-hydroxyazo or especially o,o'-dihydroxyazo dyestuffs of the benzene-azo-benzene, naphthalene-azo-naphthalene, benzene-azo-naphthalene, benzene-azo-pyrazole or benzene-azo-acetoacetic acid amide type.

The guanidines on which the guanidinium salts are based correspond to the formula

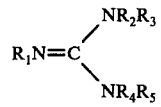

wherein
$R_1$ denotes amino, hydrogen, alkyl with 1 – 18 C atoms, cycloalkyl with 5 or 6 C atoms or phenyl which is optionally substituted by chlorine, methyl, methoxy or nitro, and $R_2$, $R_3$, $R_4$ and $R_5$ represent hydrogen, alkyl with 1 – 18 C atoms, cycloalkyl with 5 or 6 C atoms or phenyl substituted by methyl, methoxy, chlorine or nitro, or $R_2$ and $R_3$, or $R_4$ and $R_5$, together with the N atom denote a pyrrolidine, piperidine or morpholine ring. Examples of suitable guanidines are:

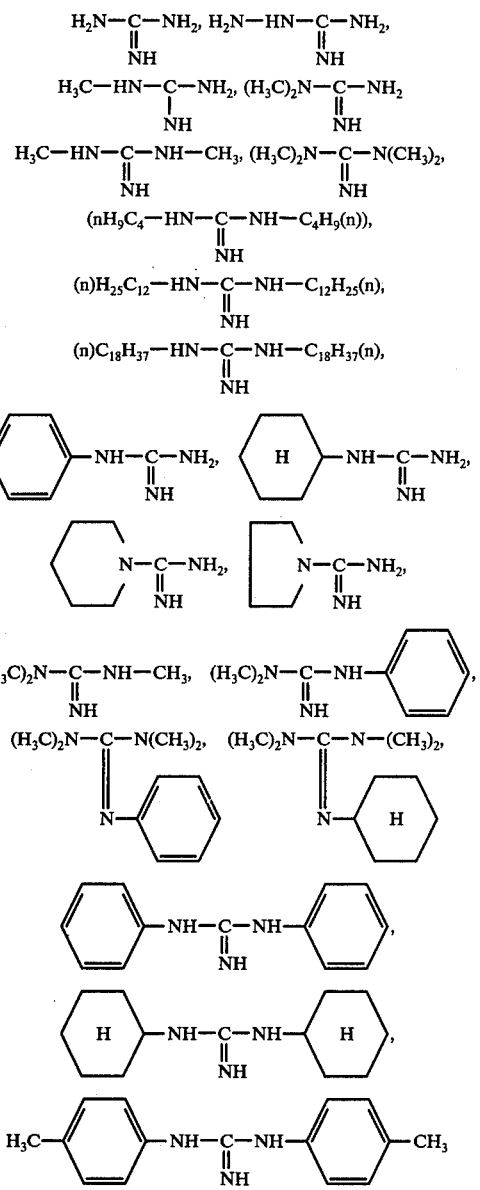

and

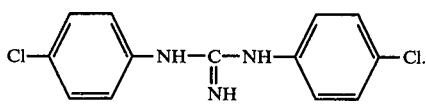

The preparation of the guanidinium salts of anionic dyestuffs can take place in the course of a broad interval of time during the production process. Preferably, the dyestuffs are precipitated directly, at pH values of about 4 to 10, by adding guanidinium salts, for example the chlorides, sulphates or carbonates, to the reaction mixture after completion of the synthesis of the dyestuff, or the anionic dyestuffs are isolated in the usual manner as alkali metal salts and subsequently reacted with guanidinium salts in aqueous solution or suspension, before or during the comminution process.

Suitable surface-active agents are non-ionic and anionic dispersing agents, such as are listed, for example, in German Offenlegungsschriften (German Published Specifications) 2,127,669 and 2,244,263.

Furthermore, alkaline, neutral or acid salts or substances which are not in the nature of salts can be admixed to the dyeing preparations according to the invention, as formulation auxiliaries and anti-dusting agents, before or after drying, examples being alkali metal chlorides, alkali metal sulphates, alkali metal carbonates and alkali metal phosphates, ammonium chloride, urea, dextrin, sucrose, polyvinyl alcohol, polyvinylpyrrolidone or small amounts of high-boiling mineral oils and other products.

The comminution is carried out by subjecting 5 – 40 parts by weight of guanidinium salt of the dyestuff, or of sodium salt of the dyestuff and a guanidinium salt, 2 – 20 parts by weight of surface-active agent and 40 – 93 parts by weight of water, if appropriate after preliminary comminution of the dyestuff to a particle size of at most about 100 microns, to intimate mechanical comminution, for example in a kneader or in a mill, such as a ball mill or attrition mill. A high-speed stirred ball mill is particularly suitable. The grinding is continued until the particle size of the dyestuff is less than 10 microns, advantageously less than 3 microns, this situation generally being reached after 10 – 30 minutes' residence time in a high-speed stirred ball mill.

It is frequently advantageous to add further surface-active agent and, if appropriate, formulation auxiliaries and anti-dusting agents, to the dyestuff dispersion after the grinding process but before drying.

The drying of the ground dispersion of the guanidinium salt of the dyestuff is advantageously carried out by freeze-drying or by evaporation, for example by vacuum drying, Venuleth drying or, preferably, spray drying. Pulverulent dyeing preparations or, in the case of spray drying, pulverulent or granular dyeing preparations are obtained, which contain 10 – 70% by weight, preferably 20 – 50% by weight, of dyestuff or dyestuff mixture as the guanidinium salt, 10 – 90% by weight, preferably 30 – 70% by weight, of surface-active agent or surface-active agent mixture, 0 – 50% by weight of formulation auxiliaries, 0 – 2% by weight of anti-dusting agents and small residual amounts of water. These dyeing preparations dissolve in cold water simply on stirring in. Their solubility in cold water at 20° – 25° C, determined by the Capponi method (Textilveredelung 2 (1967), No. 1, page 13 – 16) is at least 20 g/l.

EXAMPLE 1

A mixture of 35 g of the guanidine salt of the formula

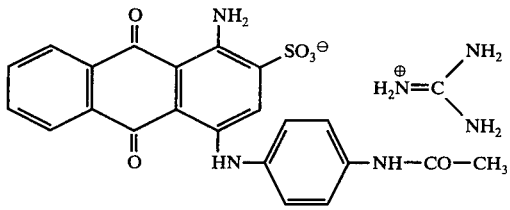

(which has been prepared by reaction of the Na salt of the dyestuff with guanidine sulphate in water), 64.5 g of Na ligninsulphonate and 300 ml of water is ground in a high-speed stirred ball mill, such as is described, for example, in the journal "Farbe und Lack" 71 (1965), page 377, for 15 minutes, with glass beads of diameter 0.3 – 0.4 mm. The particle size of the dyestuff is less than 4 microns. About 90% of the dyestuff particles are smaller than 1 micron. After separating off the glass beads, 0.5 g of a high-boiling mineral oil fraction with an average of 25 carbon atoms in the molecule is added to the dyestuff dispersion, while stirring, and the mixture is dried in a spray drier (input temperature 180° C, output temperature 90° C). A granular dyestuff which readily dissolves in water at room temperature to the extent of 50 g/l is obtained. The granular dyestuff dyes polyamide fibres in a blue colour, in accordance with known dyeing processes.

Instead of the dry dyestuff and ligninsulphonate it is also possible to employ a moist dyestuff paste and an aqueous solution of the ligninsulphonate, in which case the amount of water added is reduced correspondingly.

EXAMPLE 2

A mixture of 42 g of the guanidine salt of the formula

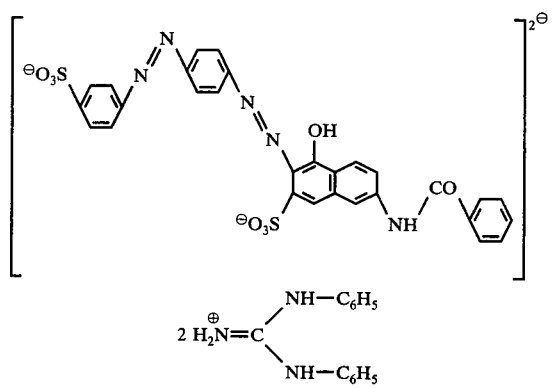

30 g of a condensation product of naphthalenesulphonic acid and formaldehyde and 720 ml of water are ground for 20 minutes, analogously to Example 1. After separating off the glass beads, 0.5 g of a high-boiling mineral oil fraction and 27.5 g of Na ligninsulphonate are added to the dyestuff dispersion, while stirring. The granules obtained by spray drying dissolve to the extent of 40 g/l in cold water. Using known dyeing processes, a red pulp-coloured paper is obtained.

EXAMPLE 3

A mixture of 28 g of the guanidine salt of the formula 35.8 g of Na ligninsulphonate, 35.8 g of a condensation product of naphthalenesulphonic acid and formaldehyde and 300 ml of water is ground analogously to Example 1, de-dusted by means of 0.4 g of a high-boiling mineral oil fraction, and dried. This granular dyestuff has a solubility of 50 g/l in cold water and dyes wool in an orange colour according to known dyeing processes.

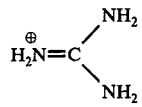

| Guanidine salt of the dyestuff | | Colour Shade |
|---|---|---|
| 4. | | yellow |
| 5. | | yellow |
| 6. | | orange |
| 7. | | red |
| 8. | | blue |

We claim:

1. Dry, particulate solid dyestuff preparation which is soluble in cold water and consists essentially of 10 to 70% by weight of the guanidinium salt of an anionic dyestuff or mixture of anionic dyestuffs having a particle size of not more than 10 microns and 10 to 90% by weight of a surface-active agent or mixture of surface-active agents.

2. The preparation of claim 1 wherein the amount of guanidinium salt is 20–50% by weight of the preparation.

3. The preparation of claim 1 wherein the amount of surface-active agent is 30–70% by weight of the preparation.

4. The preparation of claim 1 which is capable of being dissolved in water at 20°–25° C to the extent of at least 20 grams per liter.